May 18, 1954 — L. A. FINE — 2,678,495
DENTAL ARTICULATOR
Filed Nov. 14, 1949 — 2 Sheets-Sheet 1

Inventor:
LOUIS ADRIEN FINE
By Richardson, David and Nordon
Att'ys

May 18, 1954.  L. A. FINE  2,678,495
DENTAL ARTICULATOR
Filed Nov. 14, 1949  2 Sheets-Sheet 2

Inventor
LOUIS ADRIEN FINE
By Richardson, David and Nordon
Atty's

Patented May 18, 1954

2,678,495

UNITED STATES PATENT OFFICE 2,678,495

DENTAL ARTICULATOR

Louis Adrien Fine, La Palisse, France

Application November 14, 1949, Serial No. 127,155

Claims priority, application France July 6, 1949

7 Claims. (Cl. 32—32)

Articulators of which use has been made up to the present day for the making of dental prostheses or the artificial replacement of teeth intended for completely toothless persons all provide in quite an imperfect manner the functional movements that they are to execute; they are not capable of producing themselves the correct relation between the movements of the temporo-maxillary jointing and the actual jaws of the patient. No articulator for the interlocking of the movements of the upper and lower molars has so far succeeded in generating the natural functional movement, no standard form of articulators is therefore physiological or productive of the normal functions.

Furthermore, in various scientific interchanges of ideas, stress has been laid always on the complexity of the diagram of the temporo-maxillary or mandibular point and the ensuing great difficulty in creating a reproduction of the joint itself.

The object of my invention is a dentist's articulator operating in conformity with anatomically and physiologically correct principles. It includes teeth-carrying members that are exact replicas of human cranium bones and that reproduce perfectly the operative movements of human jaws, whereby previously encountered inconveniences are removed.

My improved articulator comprises upper and lower members forming exact replicas of the temporo-maxillary bones, the interengaging surfaces of which are in exact conformity with the average shape of a man's cranium and said members are associated with bodies engaged between the upper member and the parts of the lower member corresponding to the condyles, said bodies corresponding to the complete menisci of the temporo-maxillary jointing. These menisci have a volume corresponding to that of actual cranial menisci and their presence provides for relative movements between the two members of the articulators that are exactly similar to the natural physiological relative movements between the upper and lower portions of the skull. As a matter of fact, the upper member includes replicas of the transverse processes of the glenoids, of the heads of the temporal condyles, the glenoid cavities and of the zygomatic processes, while the mandible member includes, replicas of the coronoid processes, of the condyles and of the necks of the mandible.

The articulator according to my invention includes furthermore:

An interlocking system including a clamping screw at the rear of the mandible member.

Elastic attachments having fixed points of insertion on the two members and corresponding respectively to the constrictor muscles and to the depressor muscles.

A box adapted to enclose the records of patterns.

Sub-nasal reference marks and chin reference marks.

Other characteristic features of my invention will furthermore appear more clearly from the following disclosure, reference being made to accompanying diagrammatic drawings, given by way of a non-restrictive example and illustrating an embodiment of the invention. In said drawings.

Figure 2:
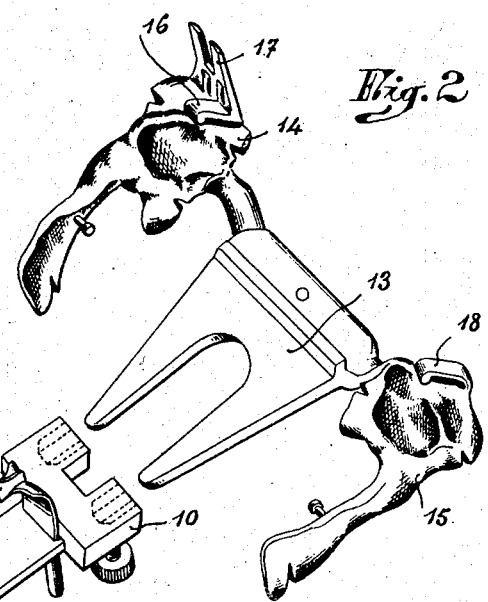
Fig. 2 is a perspective view from below of the rear piece of the upper member.
Figure 3:
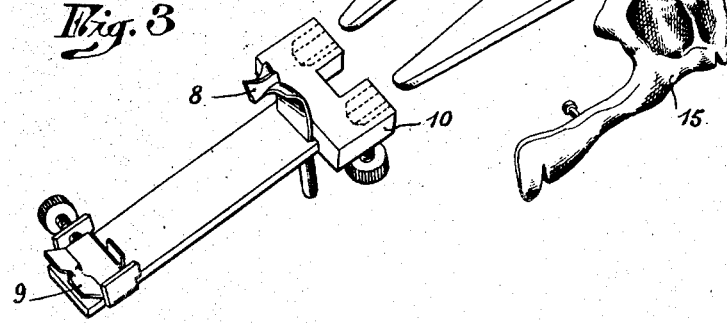
Fig. 3 is a perspective view from below of the front piece of the upper member.

My improved articulator includes two main members of which the lower one, which is a replica of the mandible, is formed by a single piece while the upper member includes two pieces, the rear piece being shown in Fig. 2 and the front piece in Fig. 3.

Figure 1:
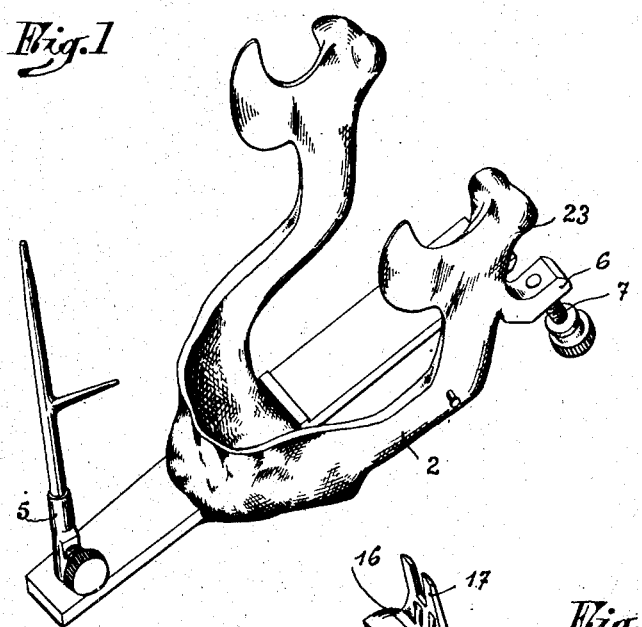
Fig. 1 is a perspective view of the lower member of the articulator.
Figure 4:
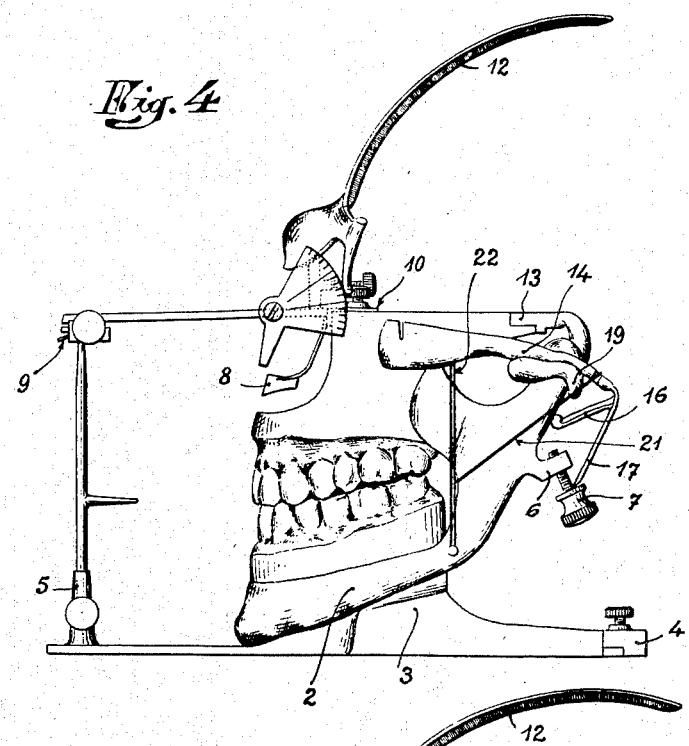
Fig. 4 is an elevational side view of the articulator in its closed position incorporating the parts shown in Figs. 1, 2 and 3 with the addition of a quadrant.
Figure 5:
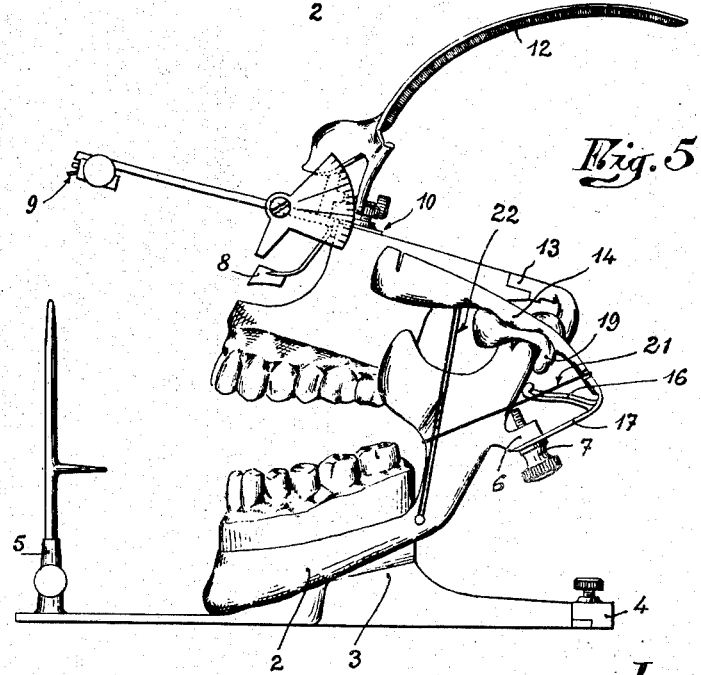
Fig. 5 is a similar view of the articulator in its open position.

The rigid mandible member illustrated in Figs. 1, 4 and 5 is a substantial replica of an average human mandible as shown at 2, said member including a central piece 3 balancing the weight of the teeth on the articulator and strengthening the part forming a replica of the symphysis of the mandible, a rear balancing part 4 and a stylus-carrying front part 5. The mandible member 2 is furnished close to the neck of the condyle with a lug 6 into which is screwed a screw 7 for general interlocking purposes as disclosed hereinafter.

The upper member which is a replica of the upper maxillary includes an upper front piece (Fig. 3) and an upper rear piece (Fig. 4). The front piece thereof (Figs. 3, 4 and 5) is provided with a sub-nasal part 8, a box 9 inside which is carried a reference diagram, the interlocking part 10 for connection with the upper rear piece and the additional naso-frontal piece 12.

The upper rear piece (Figs. 2, 4 and 5) is provided with a central part 13 intended to carry the upper tooth pattern, a left side part 14 and a right side part 15. The left side part 14 is furnished with a cam 16 for engagement with the lower member and with a part 17 cooperating with the lug 6 on the lower member for the interlocking of the upper and lower main pieces. The right side part 15 is provided with a cam 18 similar to cam 16.

The upper and lower members are hinged together through their cooperating surfaces that are exact replicas of the corresponding parts of an average skull, with the interposition of the two small members 19 which are in their turn exact replicas respectively of an average right hand and left hand meniscus, including the synovial membrane. Rubber strips of similar diameter finally play the part of the main muscles of the jaw, the strip 21 corresponds to the constrictor muscles and the larger strip 22 corresponds to the depressor muscles.

All the pieces referred to hereinabove are made to advantage from cast bronze or brass, except the menisci that are preferably made of acrylic resin.

The working of my improved articulator is as follows:

Assuming it is closed and each of the two members is furnished with a tooth pattern as shown in Fig. 4, and as far as the relative depression movement of the main lower member i. e., the opening movement of the main lower member relative to the main upper member is concerned, the operator should exert a stress to open the articulator through a lowering of the lower member in which case the two members act as levers and transmit said stress to the menisci.

The cams 16 and 18 on the left side and right side pieces 14 and 15 are submitted to a turning movement so that they swing into engagement with the rear portion of the condyles 23 forming the upper ends of the mandible member as shown in Fig. 1 whereby this turning movement is brought to a stop. While the driving stress is still operative and the constrictor strip 21 urges the temporo-maxillary or mandibular joint into its closed position by pressure, the menisci are pushed forwards; they slide but their concavity is set against the convexity of the temporo-maxillary joint.

They form thus a wedge through their actual thickness and widen the joints referred to and the operative stress constrains them to move forwardly as allowed by the shape given to the different surfaces engaging the menisci and that are strictly in accordance with the corresponding surfaces of an average human skull. These surfaces engaging the menisci form a kind of gear therewith so as to reduce the amplitude of the lowering movement of the mandible member. If, furthermore, a transverse motion is associated with the movement just described, it is transformed into a rotation through the agency of the forward movement of the menisci, under the action of the heads of the condyles of the mandible member on the upper member.

The jaws are returned into their closed position and then the teeth are ground to obtain a correct play in the articulator.

It must be observed that the temporo-maxillary articulator movement of the surfaces serving for artificial dental prostheses is registered by grinding the tooth surfaces.

As the meniscus 19 divides the temporo-maxillary joint into two elementary joints, to wit a super-meniscal and a submeniscal joint, the movements corresponding to the opening and closing of the jaw are obtained through the submeniscal joints while the front prehensory, masticating the lateral movements are produced through the supermeniscal surfaces.

The articulator members are secured together solely through the rear clamping screw on the left hand rising arm of the mandible member, this screw allowing furthermore a gradual adjustable opening of the jaws.

The articulator 5 operates in the same manner as the conventional articulators, and correspondingly plaster patterns are made and fastened by means of jointing wax while the reference points taken on the mouth of the patient correspond exactly to predetermined points on the articulator.

The inner pattern carrier has for its advantage the possibility of providing through a clamping screw the holding or the release of the plaster cast as desired.

The advantages of my improved articulator are chiefly as follows:

Its operation corresponds exactly to human behaviour since its joint is an exact replica of the human temporo-maxillary joint and the elastic strips act exactly in the manner of the depressor muscle and constrictor muscle, their movement assuming a human degree of flexibility;

Its handling is very simple and requires no auxiliary gear work,

It allows defining further reference marks such as the sub-nasal mark and the chin mark;

It allows executing prostheses along a plane that is parallel to the co-called Camper plane which passes through the subnasal reference mark and the aural channel;

The addition of the naso-frontal part 12 gives the articulator a finish that allows defining directly the facial angle and the Simon line i. e. the perpendicular line from the point of the greatest slope of the orbital recess, The presence of the subnasal and chin reference marks enables one to check the arrangement of the upper medial piece under control of Cuvier's angle, i. e. the angle between the lines connecting the centre point of the incisors with the frontal point and the aural channel respectively;

The operation of the articulator is extremely easy;

The reduced speed of closing of the articulator members allows a considerable accuracy in the checking of the dental prostheses;

The two members and associated menisci bring an automatic remedy to any defect in the mounting and for instance, a tooth projecting beyond the normal closing line of the mandible is automatically duplicated on the opposed corresponding surfaces.

Obviously, my invention is by no means restricted to the embodiment disclosed and it covers all modifications thereof falling within the scope of the accompanying claims.

What I claim is:

1. An articulator for dentists, adapted to reproduce the movements of a human jaw, comprising two members constituting replicas of normal human temporo-maxillary bones, each including a surface that is a substantial replica of the interengaging surfaces of the corresponding human bones, and auxiliary members inserted between said surfaces of the first members and constituting substantial replicas of the menisci of a normal human skull.

2. An articulator for dentists, adapted to reproduce the movements of a human jaw, comprising two members constituting replicas of normal human temporo-maxillary bones, each including a surface that is a substantial replica of the interengaging surfaces of the corresponding human bones, and auxiliary members inserted between said surfaces of the first members and constituting substantial replicas of the menisci of a normal human skull and elastic strips interconnecting the two first members to control their relative movement.

3. A dentist's articulator, comprising an upper member constituting a substantial replica of a temporal bone piece of a normal human skull, said member including substantial replicas of the two zygomatic extensions and a nose piece provided with a subnasal reference mark, said bone piece being provided further with a substantial replica of human glenoid recesses, a lower member forming a substantial replica of a human mandible and including substantial replicas of the mandibular condyle ends and a chin member provided with a reference mark, and auxiliary members forming substantial replicas of complete human menisci including the synovial membranes fitted in the same manner as the menisci in the human skull between the replicas of the condyle ends and the replicas of the glenoid recesses.

4. A dentist's articulator, comprising an upper member constituting a substantial replica of a temporal bone piece of a normal human skull, said member including substantial replicas of the two zygomatic extensions and a nose piece provided with a subnasal reference mark, said bone piece being provided further with a substantial replica of human glenoid recesses, a lower member constituting a substantial replica of a human mandible and including substantial replicas of the mandibular condyle ends and a chin member provided with a reference mark and auxiliary members constituting substantial replicas of complete human menisci including the synovial membranes fitted in the same manner as the menisci in the human skull between the replicas of the condyle ends and the replicas of the glenoid recesses and elastic strips connecting the zygomatic extensions with the lower member.

5. In an articulator, the provision of a lower member and an upper member adapted to assume a relative movement with reference to each other and the surfaces of which engaging each other during said relative movement are shaped as substantial replicas of the upper ends of the mandible condyles and of the glenoid recesses on the maxillary bone respectively and intermediary members fitted between said surfaces of the two first members and constituting substantial replicas of the menisci in human skulls.

6. In an articulator, the provision of a lower member and an upper member adapted to assume a relative movement with reference to each other and the surfaces of which engaging each other during said relative movement are shaped as substantial replicas of the upper end of mandible condyles and of the meniscal recesses on the maxillary bone respectively and intermediary members fitted between said surfaces of the two first members and constituting substantial replicas of the menisci in human skulls and elastic strips interconnecting the lower and upper members.

7. An articulator for dentists adapted to reproduce the movements of a human jaw comprising members constituting replicas respectively of the temporo-maxillary bones, of the condyles and of the menisci, the interengaging surfaces of said members constituting substantial replicas of the interengaging surfaces of the corresponding human bones, condyles and menisci, the menisci being fitted between the interengaging surfaces of the replicas of the temporo-maxillary bones.

References Cited in the file of this patent

UNITED STATES PATENTS

| Number | Name | Date |
| --- | --- | --- |
| 1,471,019 | Wilson | Oct. 16, 1923 |
| 1,588,091 | Burch | June 8, 1926 |
| 2,389,101 | Whittemore | Nov. 13, 1945 |